US012680676B2

(12) United States Patent
Archer et al.

(10) Patent No.: US 12,680,676 B2
(45) Date of Patent: Jul. 14, 2026

(54) PRINTED CIRCUIT BOARD FOR AN LED MODULE, LED MODULE, AND LED LIGHTS

(71) Applicants: ZUMTOBEL LIGHTING GMBH, Dornbirn (AT); Thorn Lighting Ltd., London (GB)

(72) Inventors: Peter Archer, Durham (GB); Tamrat Desta, Dornbirn (AT); Cristian Olariu, Dornbirn (AT)

(73) Assignees: Zumtobel Lighting GmbH, Dornbirn (AT); Thorn Lighting Ltd., London (GB)

( * ) Notice: Subject to any disclaimer, the term of this patent is extended or adjusted under 35 U.S.C. 154(b) by 230 days.

(21) Appl. No.: 18/704,519

(22) PCT Filed: Nov. 7, 2022

(86) PCT No.: PCT/EP2022/080913
§ 371 (c)(1),
(2) Date: Apr. 25, 2024

(87) PCT Pub. No.: WO2023/083728
PCT Pub. Date: May 19, 2023

(65) Prior Publication Data
US 2024/0410553 A1 Dec. 12, 2024

(30) Foreign Application Priority Data
Nov. 9, 2021 (DE) ..................... 20 2021 106 104.9

(51) Int. Cl.
*F21V 19/00* (2006.01)
*F21V 23/00* (2015.01)
(Continued)

(52) U.S. Cl.
CPC ........ *F21V 19/0025* (2013.01); *F21V 23/006* (2013.01); *F21Y 2113/00* (2013.01); *F21Y 2115/00* (2016.08)

(58) Field of Classification Search
None
See application file for complete search history.

(56) References Cited

U.S. PATENT DOCUMENTS

| | | | | |
|---|---|---|---|---|
| 5,112,230 | A | 5/1992 | DeSimone | |
| 8,272,757 | B1 * | 9/2012 | Fan ....................... | H10W 90/00 362/800 |

(Continued)

FOREIGN PATENT DOCUMENTS

| | | | |
|---|---|---|---|
| DE | 202018104566 | U1 | 9/2018 |
| DE | 102019217344 | A1 | 5/2021 |
| EP | 1233661 | A2 | 8/2002 |

OTHER PUBLICATIONS

PCT/EP2022/080913, International Search and Written Opinion, dated Feb. 17, 2023, 6 pages.

*Primary Examiner* — Timothy J Thompson
*Assistant Examiner* — John B Freal
(74) *Attorney, Agent, or Firm* — Andrus Intellectual Property Law, LLP

(57) ABSTRACT

A printed circuit board (1) for an LED module (2) comprises mechanical weaknesses (11) in a substrate of the printed circuit board (1), which weaknesses form at least one at least electrically interruptible substrate bridge (12A, 12B), and a plug connector (13) having four terminals (13.1-13.4) A first LED light source (14) can be connected between a first anode-cathode pair (13.1, 13.4) of the four terminals (13.1-13.4), and a second LED light source (15) can be connected between a second anode-cathode pair (13.2, 13.3) of the four terminals (13.1-13.4) A pair of anodes (13.1, 13.2) of the four terminals (13.1-13.4) is galvanically interconnected via
(Continued)

a first (12A) of the at least one substrate bridges (12A, 12B) The printed circuit board (1) can be connected using the plug connector (13) to at least one LED driver for the LED module (2) via two or three separate galvanic connections depending on the state of the at least one substrate bridge (12A, 12B).

10 Claims, 6 Drawing Sheets

(51) Int. Cl.
*F21Y 113/00* (2016.01)
*F21Y 115/00* (2016.01)

(56) References Cited

U.S. PATENT DOCUMENTS

| | | | | |
|---|---|---|---|---|
| 10,271,393 | B2 * | 4/2019 | Miskin | H05B 45/40 |
| 2004/0195979 | A1 * | 10/2004 | Plotz | H05B 45/14<br>362/800 |
| 2004/0252117 | A1 * | 12/2004 | Tanada | G09G 3/32<br>345/212 |
| 2009/0026972 | A1 * | 1/2009 | Shakuda | H05B 45/00<br>315/191 |
| 2017/0006710 | A1 * | 1/2017 | Diana | H05K 1/0293 |

* cited by examiner

PRINTED CIRCUIT BOARD FOR AN LED MODULE, LED MODULE, AND LED LIGHTS

CROSS-REFERENCE TO RELATED APPLICATION

The present application is the U.S. national stage application of international application PCT/EP2022/080913 filed Nov. 7, 2022, which international application was published on May 19, 2023 as International Publication WO 2023/083728 A1. The international application claims priority to German Patent Application No. 20 2021 106 104.9, filed Nov. 9, 2021.

TECHNICAL FIELD OF THE INVENTION

The present disclosure from the field of lighting technology relates to a printed circuit board for an LED module, an LED module with this printed circuit board, as well as LED lights with this LED module.

BACKGROUND OF THE INVENTION

In lighting technology, lights with separately controllable light fields are in increasingly demand, such as a circular light field with a circumferential annular light field ("halo").

However, since such arrangements only constitute part of production, different printed circuit boards would have to be provided for lights with or without separately controllable light fields, with correspondingly more complex development or production and greater storage requirement.

SUMMARY OF THE INVENTION

There is therefore a need for circuit boards which make development and production as well as stock keeping less burdensome.

According to the invention, this object is achieved by a printed circuit board for an LED module having the features of claim 1, by an LED module having the features of claim 5, and by LED lights having the respective features of claims 6 to 9. The dependent claims define embodiments of the invention.

A printed circuit board for an LED module according to a first aspect comprises mechanical weakenings in a substrate of the printed circuit board which form at least one at least electrically interruptible substrate bridge, and a plug connector having four terminals. A first LED light source can be connected between a first anode-cathode pair of the four terminals. A second LED light source can be connected between a second anode-cathode pair of the four terminals. A pair of anodes of the four terminals is galvanically interconnected via a first of the at least one substrate bridges. The printed circuit board can be connected using the plug connector to at least one LED driver for the LED module via two or three separate galvanic connections depending on the state of the at least one substrate bridge.

According to one exemplary embodiment, the at least one substrate bridge can be punched out of or detached from the substrate of the printed circuit board.

According to one exemplary embodiment, the printed circuit board comprises solder connections at ends of the respective substrate bridge for subsequent galvanic bridging of the respective substrate bridge.

According to one exemplary embodiment, the printed circuit board comprises at least one spring-loaded conductor bridge for subsequent galvanic bridging of the respective substrate bridge between the solder connections.

According to one exemplary embodiment, the at least one substrate bridge comprises two substrate bridges, a pair of cathodes of the four terminals is galvanically interconnected via a second of the at least one substrate bridges, and the printed circuit board can be connected to the at least one LED driver for the LED module by the plug connector depending on the state of the at least one substrate bridge via two, three or four separate galvanic connections.

An LED module according to a second aspect comprises a printed circuit board according to the first aspect with the first LED light source and the second LED light source.

An LED light according to a third aspect comprises an LED module according to the second aspect with intact substrate bridges, and an LED driver for jointly operating the first LED light source and the second LED light source. For this purpose, the LED driver is connected via two separate galvanic connections of the plug connector of the printed circuit board of the LED module.

An LED light according to a fourth aspect comprises an LED module according to the second aspect with an interrupted first substrate bridge of the substrate bridges, and a two-channel LED driver for operating the first LED light source and the second LED light source independently of one another. The LED driver is thereby connected via three separate galvanic connections of the plug connector of the printed circuit board of the LED module.

An LED light according to a fifth aspect comprises an LED module according to the second aspect with interrupted substrate bridges, and a two-channel LED driver for operating the first LED light source and the second LED light source independently of one another. For this purpose, the LED driver is connected via two separate pairs of galvanic connections of the plug connector of the printed circuit board of the LED module.

An LED light according to a sixth aspect comprises an LED module according to the second aspect with interrupted substrate bridges, and separate first and second LED drivers for operating the first LED light source and the second LED light source independently of one another. For this purpose, the LED drivers are connected via two separate pairs of galvanic connections of the plug connector of the printed circuit board of the LED module.

The mechanical weakenings in the substrate of the printed circuit board enable the use of a uniformly designed printed circuit board for different lighting applications. This makes development and production as well as stocking less burdensome. Furthermore, even small sales volumes can be produced from a standardized kit, and therefore also those which would be uneconomical without the uniformly designed printed circuit board. Overall, the cost position is therefore improved—also because no further components are required.

The specific function or lighting application can be freely selected at the time of production or assembly of an LED light by interrupting or separating, i.e., breaking out, the substrate bridges formed by the mechanical weakening. This can be done for example using a special tool, such as for example a punching tool (optionally prepared using prefabricated templates) or using a hand tool such as for example a screwdriver with which the substrate bridges formed by the mechanical weakenings can be separated, for example during the assembly of the LED light. As a result, conductor tracks routed via the substrate bridge are electrically interrupted. It is therefore possible to operate a plurality of LED light sources jointly when the substrate bridges are intact and separately when the substrate bridges are broken out, for example a central spot and a surrounding halo.

A comparable functionality based on plug connectors with jumpers would be associated with costs and reliability concerns regarding these additional components.

BRIEF DESCRIPTION OF THE DRAWINGS

The invention will be explained briefly below using preferred embodiments and with reference to the drawings, whereby identical reference numerals indicate identical or similar elements.

DETAILED DESCRIPTION OF EXEMPLARY EMBODIMENTS

The invention will be explained in more detail below using preferred embodiments and with reference to the drawings.

A description of exemplary embodiments in specific fields of application does not signify a limitation of these fields of application.

Elements of schematic representations are not necessarily reproduced to scale, but rather in such a way that their function and purpose will be understood by a person skilled in the art.

Unless expressly indicated otherwise, the features of the various embodiments can be combined with one another.

Figure 1:
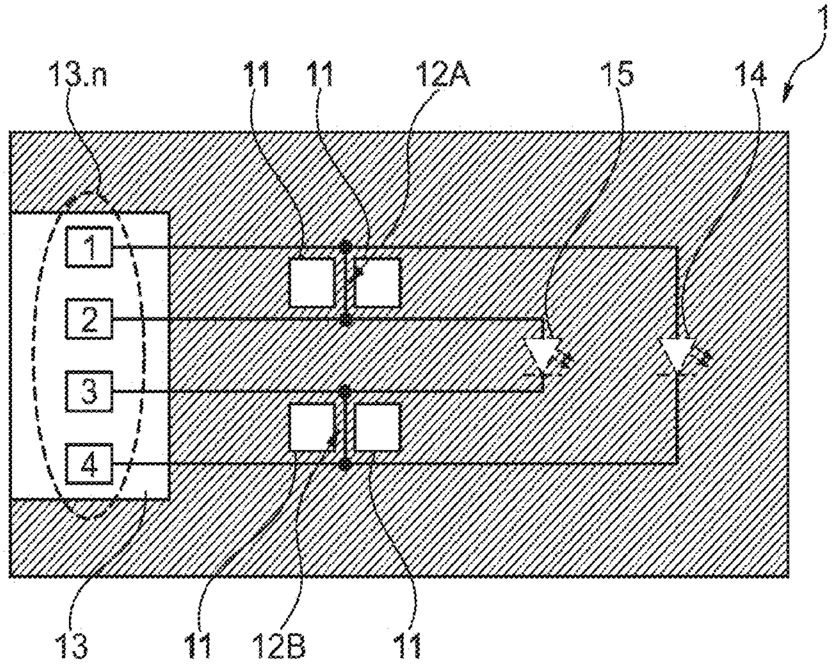
FIG. 1 and FIG. 2 schematically illustrate printed circuit boards 1 for an LED module 2 according to exemplary embodiments.

FIG. 1 schematically illustrates a printed circuit board 1 for an LED module 2 according to a first exemplary embodiment.

A printed circuit board can be understood to mean a carrier for electronic components and their electrical connection.

An LED module can be understood to mean an electrical interconnection of a plurality of light-emitting diodes (LED) on a carrier such as a printed circuit board.

The printed circuit board 1 comprises a plug connector 13 with four terminals 13.1-13.4 which are shown in FIG. 1 under the reference sign 13.*n* and are encircled in dashed lines. The individual connections are numbered consecutively from n=1 to n=4 for better differentiation.

A first LED light source 14 can be connected between a first anode-cathode pair 13.1, 13.4 of the four terminals 13.1-13.4, and a second LED light source 15 can be connected between a second anode-cathode pair 13.2, 13.3 of the four terminals 13.1-13.4. In this case, these are named by the ends of the LED light sources 14, 15 that lead into anodes or cathodes.

The LED light sources 14, 15 indicated by dashed lines in FIG. 1 can each comprise a number of parallel-connected LED chains.

The printed circuit board 1 further comprises mechanical weakenings 11 in a substrate of the printed circuit board 1, which are shown in FIG. 1 as examples of recesses of the substrate (or openings in the substrate), and that form the at least one at least electrically interruptible substrate bridge 12A, 12B. In other words, a respective conductor track of the printed circuit board 1 is therefore routed via the respective substrate bridge 12A, 12B. Furthermore, other mechanical weakenings 11 would also be conceivable, for example in the form of slots, milling grooves, perforations, or the like.

The at least one substrate bridge 12A, 12B can be punched out or separated from the substrate of the printed circuit board 1. This can be done for example using a special tool, such as for example a punching tool during the production of a light (optionally prepared using prefabricated templates), or by cutting/breaking out using a hand tool such as a screwdriver or pliers during the assembly of a light. A specific function or lighting application at the time of production or installation of an LED light can thereby be freely selected.

Very generally, a pair of anodes 13.1, 13.2 of the four terminals 13.1-13.4 is galvanically interconnected via a first 12A of the at least one substrate bridges 12A, 12B.

Depending on the state of the at least one substrate bridge 12A, 12B, the printed circuit board 1 can therefore be connected by the plug connector 13 via two or three separate galvanic connections to at least one LED driver for the LED module 2.

The at least one substrate bridge 12A, 12B can comprise two substrate bridges 12A, 12B, wherein a pair of cathodes 13.3, 13.4 of the four terminals 13.1-13.4 can then be galvanically interconnected via a second 12B of the at least one substrate bridges 12A, 12B.

Depending on the state of the at least one substrate bridge 12A, 12B, the printed circuit board 1 can then be connected by the plug connector 13 via two, three or four separate galvanic connections to the at least one LED driver for the LED module 2.

Figure 2:
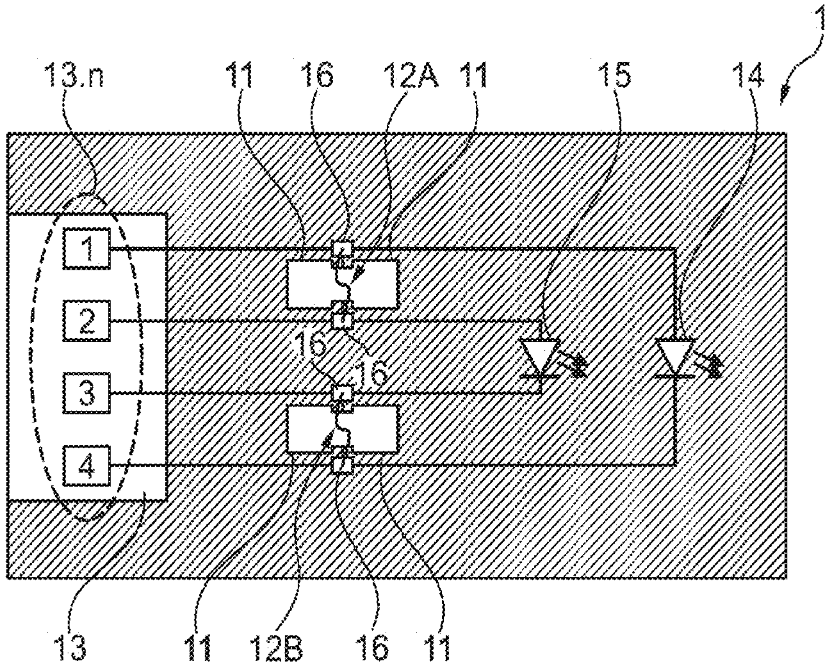

FIG. 2 schematically illustrates a printed circuit board 1 for an LED module 2 according to a second exemplary embodiment.

The printed circuit board 1 of FIG. 2 can comprise soldering connections 16 at ends of the respective substrate bridge 12A, 12B for subsequent galvanic bridging of the respective substrate bridge 12A, 12B.

At the time of production, these soldering connections 16 can be used as test points, for example for final checks, and for re-connecting circuits which have been galvanically separated by interrupting the substrate bridges 12A, 12B.

The re-connection can be done, for example, using solder connections. In particular, the printed circuit board 1 can have at least one spring-loaded conductor bridge for subsequent galvanic bridging of the respective substrate bridge 12A, 12B between the soldering connections 16.

Figure 3:
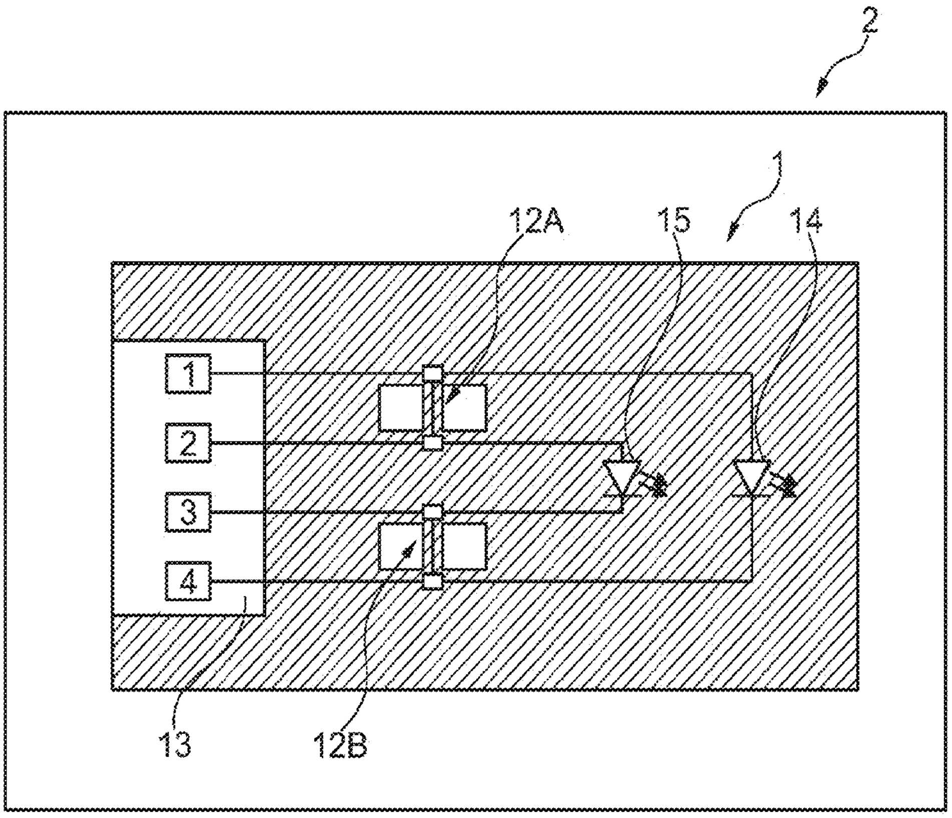
FIG. 3 schematically illustrates an LED module 2 according to an exemplary embodiment.

FIG. 3 schematically illustrates an LED module 2 according to a third embodiment.

The LED module 2 comprises a printed circuit board 1, which is described in more detail above, and a first LED light source 14 and a second LED light source 15.

Figure 4:
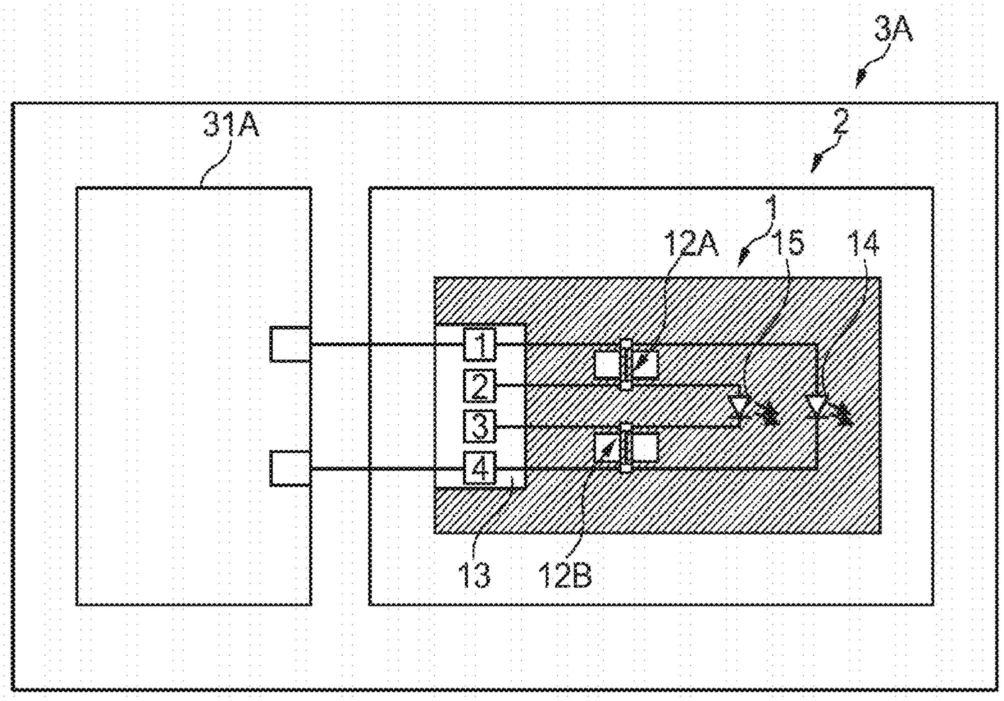
FIGS. 4-7 schematically illustrate LED lights 3A-3D according to exemplary embodiments.

FIG. 4 schematically illustrates an LED light 3A according to a fourth exemplary embodiment.

An LED light can be understood to mean an electrical interconnection of an LED light source, such as an LED module, with a driver circuit suitable for this purpose, which provides the voltages and/or currents required for operating the LED light source.

The LED light 3A comprises an above-explained LED module 2 with two intact substrate bridges 12A, 12B.

Since the pair of anodes 13.1, 13.2 of the four terminals 13.1-13.4 are galvanically interconnected via the first 12A of the at least one substrate bridges 12A, 12B, and the pair of cathodes 13.3, 13.4 of the four terminals 13.1-13.4 are galvanically interconnected via the second 12B of the at least one substrate bridges 12A, 12B, the two LED light sources 14, 15 are connected in parallel to each other.

In this configuration, the two LED light sources 14, 15 can be operated jointly. However, the two LED light sources 14, 15 should be designed for the same supply voltage. In other words, the LED chains on which the two LED light sources 14, 15 are based should each be configured identically.

For jointly operating the first LED light source 14 and the second LED light source 15, the LED light 3A comprises an LED driver 31A which is connected via two separate galvanic connections of the plug connector 13 of the printed circuit board 1 of the LED module 2.

A person skilled in the art recognizes that there are several options regarding the wiring of the LED driver 31A to the LED module 2. Thus, FIG. 4 shows wiring via the connection pair 13.1/13.4. Given the identical functioning of the light 3A, the connection pairs 13.1/13.3, 13.2/13.3 and 13.2/13.4 would also be possible.

Figure 5:
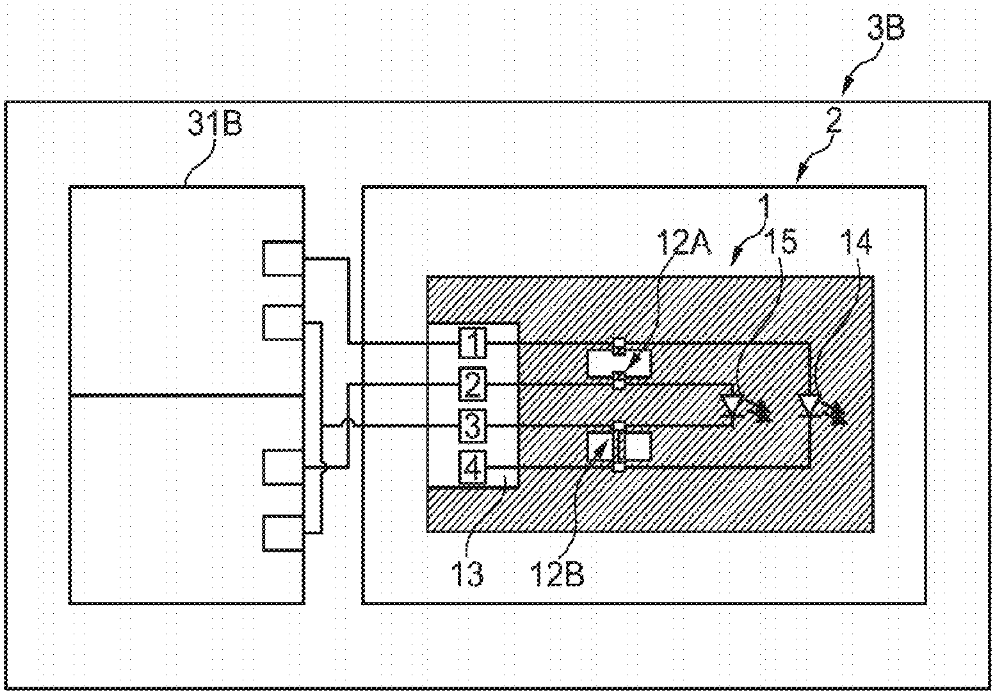

FIG. 5 schematically illustrates an LED light 3B according to a fifth exemplary embodiment.

The LED light 3A comprises an above explained LED module 2 with an interrupted first substrate bridge 12A of the substrate bridges 12A, 12B, and intact second substrate bridge 12B of the substrate bridges 12A, 12B.

In this exemplary embodiment, therefore, only the pair of cathodes 13.3, 13.4 of the four terminals 13.1-13.4 are galvanically interconnected via the second 12B of the at least one substrate bridges 12A, 12B. This means that the two LED light sources 14, 15 have a common mass reference.

In this configuration, the two LED light sources 14, 15 can be operated separately. For operating the first LED light source 14 and the second LED light source 15 independently of one another, the LED light 3B comprises a two-channel LED driver 31B which, in this exemplary embodiment, is connected via three separate galvanic connections of the plug connector 13 of the printed circuit board 1 of the LED module 2. This means that the two channels of the two-channel LED driver 31B also share the common mass reference.

With regard to the wiring of the LED driver 31B to the LED module 2, the connections 13.1/13.2/13.4 could also be selected in addition to the wiring shown in FIG. 5 via the connections 13.1/13.2/13.3 when the light 3B has an identical function.

Figure 6:
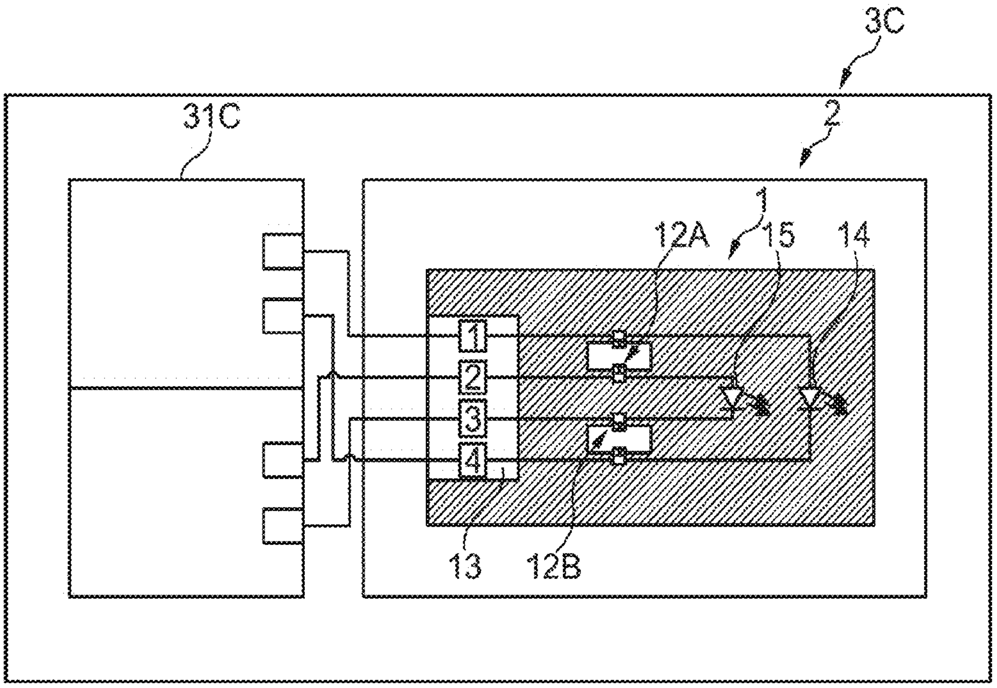

FIG. 6 schematically illustrates an LED light 3C according to a sixth embodiment.

The LED light 3C comprises an above-explained LED module 2, but with interrupted substrate bridges 12A, 12B.

Consequently in this exemplary embodiment, neither the pair of anodes 13.1, 13.2 of the four terminals 13.1-13.4 is galvanically interconnected via the first 12A of the at least one substrate bridges 12A, 12B, nor is the cathode pair 13.3, 13.4 of the four terminals 13.1-13.4 galvanically interconnected via the second 12B of the at least one substrate bridges 12A, 12B.

In this configuration, the two LED light sources 14, 15 are separately operable and comprehensively galvanically isolated. For operating the first LED light source 14 and the second LED light source 15 independently of one another, the LED light 3C comprises a two-channel LED driver 31C which, in this exemplary embodiment, is connected via two separate pairs of galvanic connections of the plug connector 13 of the printed circuit board 1 of the LED module 2.

With regard to the wiring of the LED driver 31C to the LED module 2, if the electrical conditions are suitable, it is only possible to exchange an assignment of the channels of the LED driver 31C to the LED light sources 14, 15.

Figure 7:
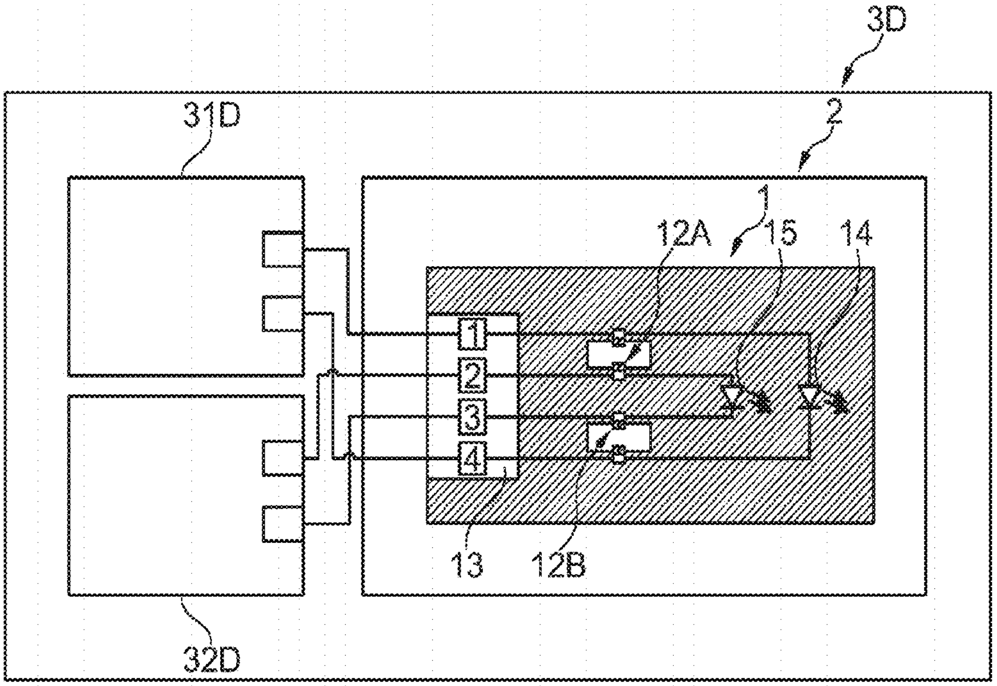

FIG. 7 schematically illustrates an LED light 3D according to a seventh embodiment.

Like the LED light 3C of FIG. 6 described in more detail above, the LED light 3D has an LED module 2 with interrupted substrate bridges 12A, 12B, but in combination with separate first and second LED drivers 31D, 32D for operating the first LED light source 14 and the second LED light source 15 independently of each other. These replace the channels of the LED driver 31C and are in turn connected via two separate pairs of galvanic connections of the plug connector 13 of the printed circuit board 1 of the LED module 2.

The invention claimed is:

1. A printed circuit board (1) for an LED module (2), comprising:

mechanical weakenings (11) in a substrate of the printed circuit board (1) which form at least one at least electrically interruptible substrate bridge (12A, 12B);

a plug connector (13) with four terminals (13.1-13.4) comprising two anode-cathode pairs;

wherein a first LED light source (14) can be connected between a first anode-cathode pair (13.1, 13.4) of the four terminals (13.1-13.4);

wherein a second LED light source (15) can be connected between a second anode-cathode pair (13.2, 13.3) of the four terminals (13.1-13.4);

wherein a pair of anodes (13.1, 13.2) of the four terminals (13.1-13.4) is galvanically interconnected via a first (12A) of the at least one substrate bridges (12A, 12B);

wherein the printed circuit board (1) can be connected by means of the plug connector (13) to at least one LED driver for the LED module (2) via two or three separate galvanic connections depending on the state of the at least one substrate bridge (12A, 12B).

2. The printed circuit board (1) according to claim 1, wherein the at least one substrate bridge (12A, 12B) can be punched out or separated from the substrate of the printed circuit board (1).

3. The printed circuit board (1) according to claim 1, having soldering connections (16) at ends of the respective substrate bridge (12A, 12B) for subsequent galvanic bridging of the respective substrate bridge (12A, 12B).

4. The printed circuit board (1) according to claim 3, having at least one spring-loaded conductor bridge for subsequent galvanic bridging of the respective substrate bridge (12A, 12B) between the soldering connections (16).

5. The printed circuit board system (1) according to claim 1, wherein the at least one substrate bridge (12A, 12B) comprises two substrate bridges (12A, 12B);

wherein a pair of cathodes (13.3, 13.4) of the four terminals (13.1-13.4) is galvanically interconnected via a second (12B) of the at least one substrate bridges (12A, 12B); and wherein the printed circuit board (1) can be connected by the plug connector (13) to the at least one LED driver for the LED module (2) via two, three or four separate galvanic connections depending on the state of the at least one substrate bridge (12A, 12B).

6. An LED module (2) having a printed circuit board (1) according to claim 5, having the first LED light source (14); and the second LED light source (15).

7. An LED light (3A), having an LED module (2) according to claim 6 with intact substrate bridges (12A, 12B); and an LED driver (31A) for jointly operating the first LED light source (14) and the second LED light source (15);

wherein the LED driver (31A) is connected via two separate galvanic connections of the plug connector (13) of the printed circuit board (1) of the LED module (2).

8. An LED light (3B), having an LED module (2) according to claim 6 with an interrupted first substrate bridge (12A) of the substrate bridges (12A, 12B); and a two-channel LED driver (31B) for operating the first LED light source (14) and the second LED light source (15) independently of one another, wherein the LED driver (31B) is connected via three separate galvanic connections of the plug connector (13) of the printed circuit board (1) of the LED module (2).

9. An LED light (3C), having an LED module (2) according to claim 6 with interrupted substrate bridges (12A, 12B); and a two-channel LED driver (31C) for operating the first LED light source (14) and the second LED light source (15) independently of one another;

wherein the LED driver (31C) is connected via two separate pairs of galvanic connections of the plug connector (13) of the printed circuit board (1) of the LED module (2).

10. An LED light (3D), having an LED module (2) according to claim 6 with interrupted substrate bridges (12A, 12B); and separate first and second LED drivers (31D, 32D) for operating the first LED light source (14) and the second LED light source (15) independently of one another;

wherein the LED drivers (31D, 32D) are connected via two separate pairs of galvanic connections of the plug connector (13) of the printed circuit board (1) of the LED module (2).

* * * * *